(12) United States Patent
Yagisawa

(10) Patent No.: US 9,426,803 B2
(45) Date of Patent: Aug. 23, 2016

(54) BASE STATION, METHOD FOR CONTROLLING BASE STATION, AND INFORMATION PROCESSING SYSTEM

(71) Applicant: FUJITSU LIMITED, Kawasaki-shi, Kanagawa (JP)

(72) Inventor: Rei Yagisawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 13/800,112

(22) Filed: Mar. 13, 2013

(65) Prior Publication Data

US 2013/0195059 A1  Aug. 1, 2013

Related U.S. Application Data

(63) Continuation of application No. PCT/JP2010/005760, filed on Sep. 24, 2010.

(51) Int. Cl.
| | |
|---|---|
| *H04L 12/06* | (2006.01) |
| *H04L 12/46* | (2006.01) |
| *H04L 29/06* | (2006.01) |
| *H04W 88/04* | (2009.01) |
| *H04W 88/06* | (2009.01) |

(Continued)

(52) U.S. Cl.
CPC ........ *H04W 72/044* (2013.01); *H04L 12/2814* (2013.01); *H04L 12/4633* (2013.01); *H04L 63/0876* (2013.01); *H04W 12/06* (2013.01); *H04W 88/04* (2013.01); *H04W 88/06* (2013.01)

(58) Field of Classification Search
USPC ......................................................... 370/329
See application file for complete search history.

(56) References Cited

U.S. PATENT DOCUMENTS

2002/0187746 A1* 12/2002 Cheng et al. ................. 455/11.1
2004/0023652 A1*  2/2004 Shah ...................... H04W 48/18
                                                        455/426.2

(Continued)

FOREIGN PATENT DOCUMENTS

| CN | 1505316 A | 6/2004 |
|---|---|---|
| CN | 101610513 A | 12/2009 |

(Continued)

OTHER PUBLICATIONS

International Search Report of PCT/JP2010/005760 dated Dec. 14, 2010.
Korean Office Action dated Feb. 27, 2014 in Korean Patent Application No. 10-2013-7007378.
Chinese Office Action mailed Feb. 27, 2015 in related Chinese Application No. 201080069216.3.

(Continued)

*Primary Examiner* — Awet Haile
*Assistant Examiner* — Yaotang Wang
(74) *Attorney, Agent, or Firm* — Staas & Halsey LLP

(57) ABSTRACT

A base station that relays data between a first information processing apparatus and a second information processing apparatus includes a processor configured to store a physical address, to transmit data to and receive data from the second information processing apparatus, and upon receiving a request from the second information processing apparatus, the request including a physical address which has been transmitted from the first information processing apparatus to the second information processing apparatus and requesting connection, to permit the first information processing apparatus to transmit data to and receive data from the base station via the second information processing apparatus, based on a result of comparison between the physical address included in the received request and the stored physical address.

20 Claims, 8 Drawing Sheets

(51) Int. Cl.
*H04W 72/04* (2009.01)
*H04W 12/06* (2009.01)
*H04L 12/28* (2006.01)

(56) References Cited

U.S. PATENT DOCUMENTS

| | | | |
|---|---|---|---|
| 2004/0095916 A1* | 5/2004 | Maki et al. | 370/338 |
| 2009/0310528 A1* | 12/2009 | Tamura | 370/315 |
| 2010/0040021 A1* | 2/2010 | Aso | H04W 8/06 370/331 |
| 2010/0046417 A1 | 2/2010 | Tamura | |

FOREIGN PATENT DOCUMENTS

| | | |
|---|---|---|
| JP | 8-84373 | 3/1996 |
| JP | 2002-300328 | 10/2002 |
| JP | 2005-192059 | 7/2005 |
| JP | 2010-146437 | 7/2010 |
| KR | 10-2008-0099748 | 11/2008 |

OTHER PUBLICATIONS

Extended European Search Report mailed Mar. 14, 2016 in related European Application No. 10857505.1.

* cited by examiner

BASE STATION, METHOD FOR CONTROLLING BASE STATION, AND INFORMATION PROCESSING SYSTEM

CROSS-REFERENCE TO RELATED APPLICATION

This is a continuation of Application No. PCT/JP2010/005760, filed on Sep. 24, 2010, the entire contents of which are incorporated herein by reference.

FIELD

The present invention relates to a base station, a method for controlling a base station, and an information processing system.

BACKGROUND

In recent years, a communication environment has been diversified, and various communication modules compatible with a wireless local area network (LAN), a wired LAN, or the like have been mounted in information processing apparatuses.

In the case of connecting such a communication module to a network, authentication may be performed between the network and a relay station. As a technique of simplifying authentication, for example, a technique of using a physical address, such as a MAC address, stored in a communication module is available. A MAC address is an address which is uniquely assigned to each communication module, and is an address which is available as a transmission-source address only in the apparatus. Therefore, an apparatus as a transmission source may be specified by using a MAC address, and thus the MAC address is available as information for easily performing authentication without inputting an authentication code.

Meanwhile, a technique is suggested in which in a case where an apparatus is incapable of connecting to a desired network, the apparatus causes another apparatus to connect to the desired network, and the apparatus connects to the desired network via the other apparatus.

However, as described above, authentication via a relay apparatus is not allowed in MAC authentication. Thus, according to the related art Japanese Laid-open Patent Publication No. 2002-300328, connecting to a network that involves MAC authentication via another apparatus is not allowed.

SUMMARY

According to an aspect of the embodiments, a base station that relays data between a first information processing apparatus and a second information processing apparatus includes a processor configured to store a physical address, to transmit data to and receive data from the second information processing apparatus, and upon receiving a request from the second information processing apparatus, the request including a physical address which has been transmitted from the first information processing apparatus to the second information processing apparatus and requesting connection, to permit the first information processing apparatus to transmit data to and receive data from the base station via the second information processing apparatus, based on a result of comparison between the physical address included in the received request and the stored physical address.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Figure 1:
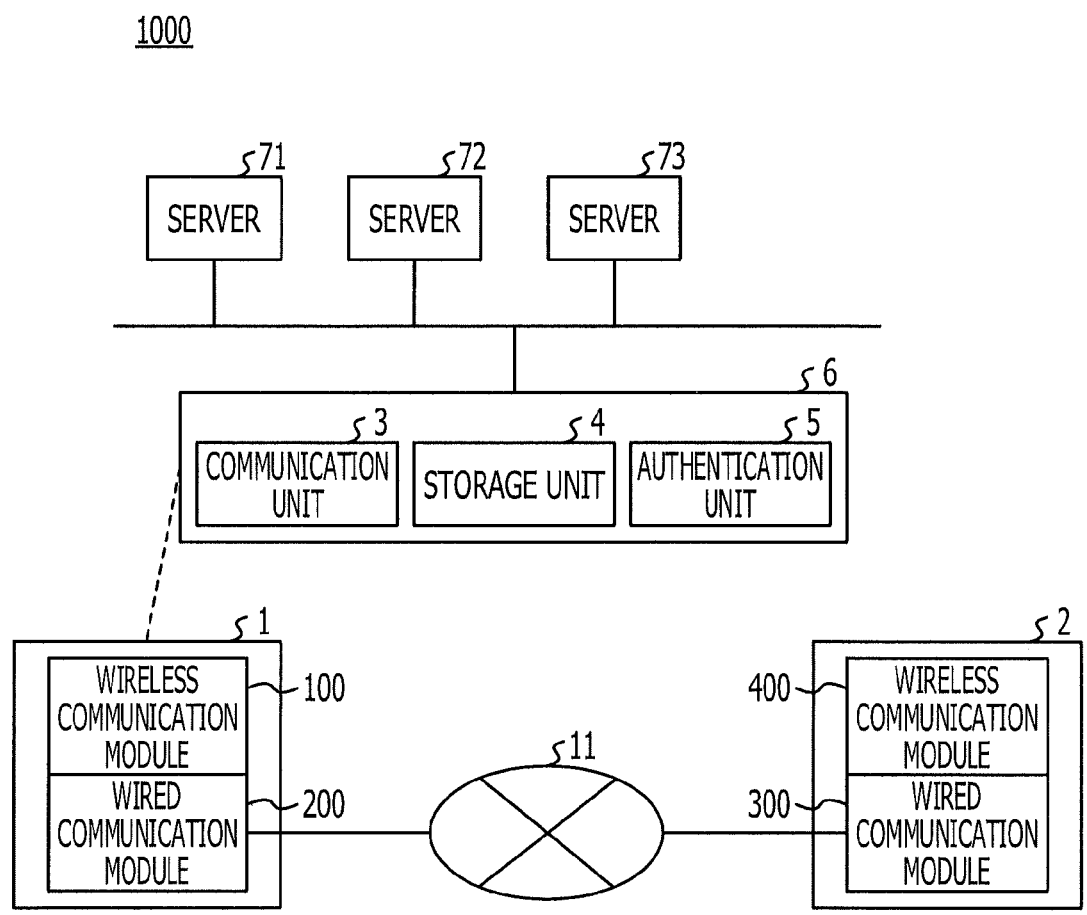
FIG. 1 is a first diagram illustrating an information processing system according to the present embodiment.

FIG. 1 illustrates an information processing system 1000 according to the present embodiment. The information processing system 1000 includes an information processing apparatus 1, an information processing apparatus 2, and a base station 6. The information processing apparatus 1 includes a wireless communication module 100 serving as a first wireless communication unit and a wired communication module 200 serving as a first communication unit. The information processing apparatus 2 includes a wireless communication module 400 serving as a second wireless communication unit and a wired communication module 300 serving as a second communication unit. The information processing apparatus 1 and the information processing apparatus 2, each including a wireless communication module and a wired communication module, are capable of simultaneously using a wireless LAN and a wired LAN.

The wired communication module 200 and the wired communication module 300 are connected to each other via a network 11, and thus the information processing apparatus 1 and the information processing apparatus 2 are capable of communicating with each other in a wired manner.

A base station 6 includes a CPU. The function of an authentication unit 5 is realized when a processor such as a CPU executes a certain program stored in a memory such as a storage unit 4. The base station 6 includes a communication unit 3 that communicates with the information processing apparatus 1, a storage unit 4 that stores identification information about the wireless communication module 100 and so forth, and an authentication unit 5 that performs an authentication process by comparing identification information transmitted from the wireless communication module 100 or the like with identification information stored in the storage unit 4, thereby enabling transmission and reception of data between the wireless communication module 100 or the like and the base station 6. The base station 6 is connected to a server 71, a server 72, and a server 73. For example, the server 71 and so forth may include the authentication unit 5, and may perform authentication for communicating with the wireless communication module 100 or the like.

Figure 2:
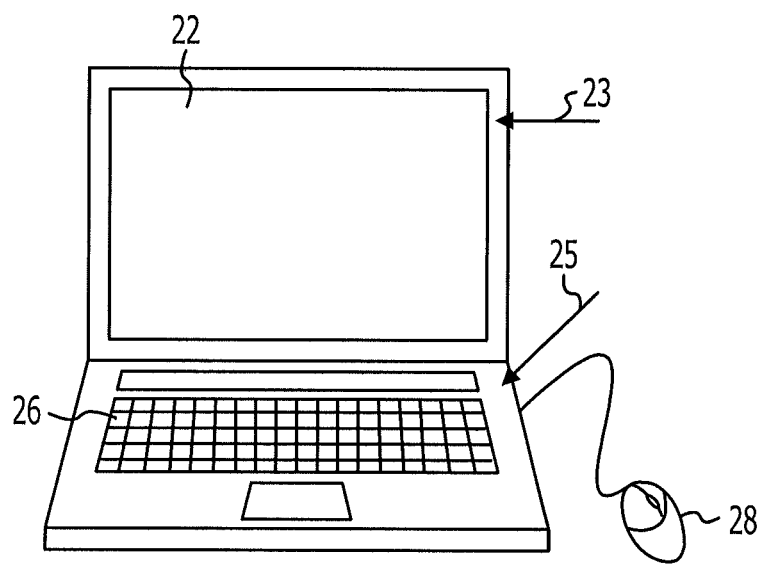
FIG. 2 is a diagram illustrating an information processing apparatus.

FIG. 2 illustrates an example of the appearance of the information processing apparatus 1 and the information processing apparatus 2 according to the present embodiment. In FIG. 2, a wireless communication module exists at the position indicted by an arrow 23, and a wired communication module exists at the position indicated by an arrow 25.

Figure 3:
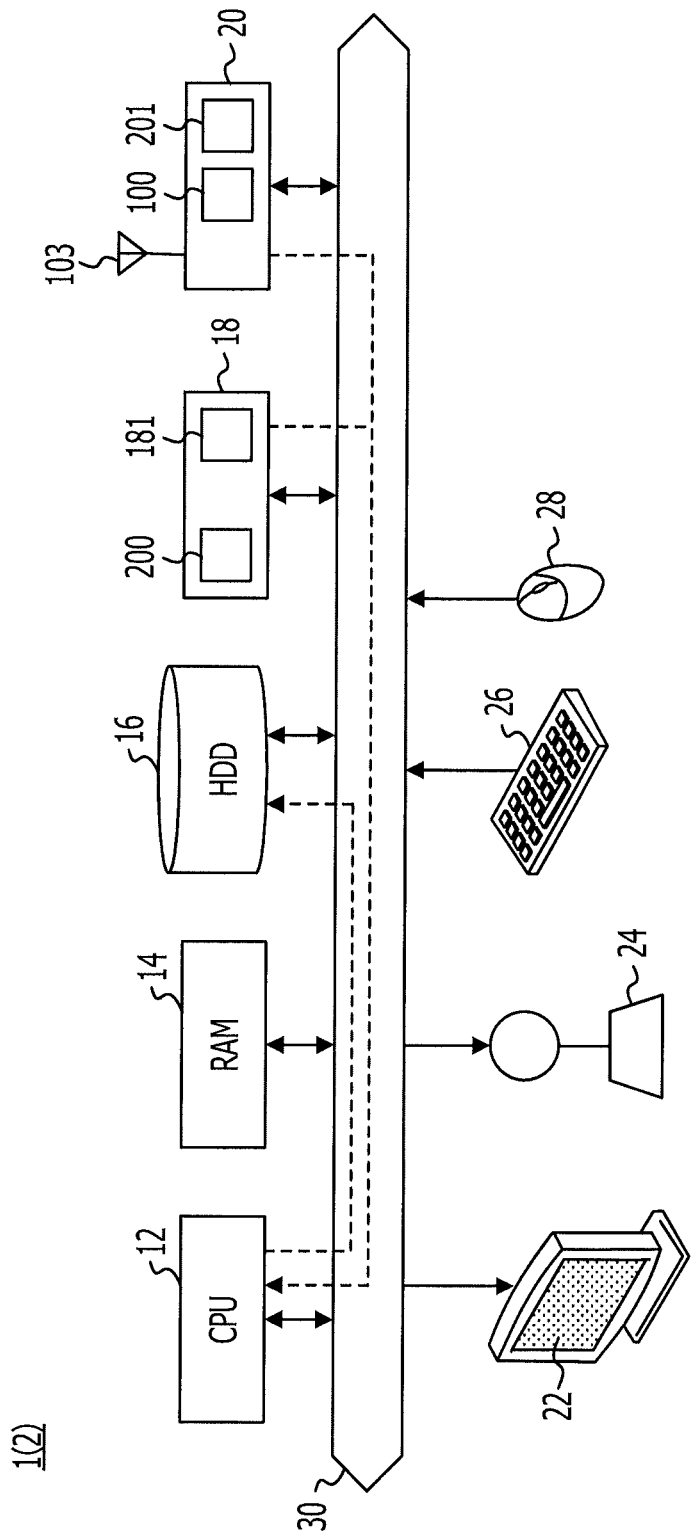
FIG. 3 is a diagram illustrating a hardware configuration of the information processing apparatus.

FIG. 3 illustrates a hardware configuration diagram of the information processing apparatus 1 and the information processing apparatus 2 according to the present embodiment. The information processing apparatus 1 includes a central processing unit (CPU) 12, a random access memory (RAM) 14, a hard disk drive (HDD) 16, a wired communication function 18, a wireless communication function 20, a display 22, a speaker 24, a keyboard 26, and a mouse 28, which are connected to one another via a bus 30. The CPU 12 performs core processing. The RAM 14 temporarily stores information. The HDD 16 continuously stores information. The wired communication function 18 performs wired communication with another information processing apparatus. The wired communication function 18 includes a storage unit 181 that stores a MAC address, which is the physical address of the wired communication function 18 and which is unique identification information. Alternatively, for example, a read only memory (ROM) may be provided, and the MAC address of the wired communication function 18 may be stored in the ROM. The wireless communication function 20 includes an antenna 103 and performs wireless communication with another information processing apparatus. The wireless communication function 20 includes a storage unit 201 that stores a MAC address, which is the physical address of the wireless communication function 20 and which is unique identification information. The display 22 displays data. The speaker 24 outputs sounds. The keyboard 26 and the mouse 28 are used for performing a data input operation. In accordance with input operations using the keyboard 26 and the mouse 28, processing, recording, and display instructions are provided to the individual units via the bus 30. In the present embodiment, transmission and reception of data between the wired communication function 18 and the wireless communication function 20 may be performed via the bus 30. The information processing apparatus 2 has a similar configuration, and thus the description thereof is omitted. The wired communication function 18 of the information processing apparatus 2 includes the wired communication module 300, and the wireless communication function 20 of the information processing apparatus 2 includes the wireless communication module 400. The function of a first processing unit or a second processing unit is realized when a CPU 12 executes a certain program stored in a memory such as an HDD 16.

Figure 4:
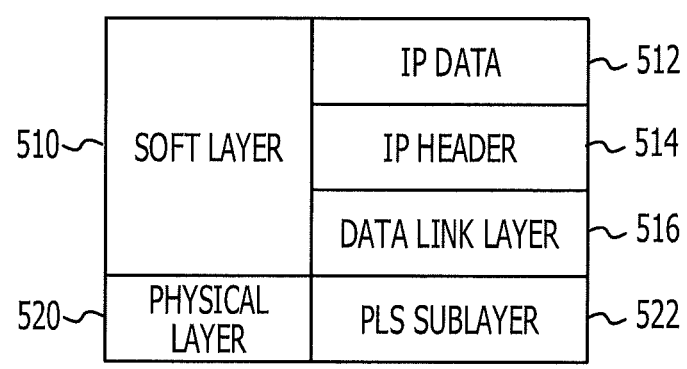
FIG. 4 is a diagram illustrating the structure of data.

FIG. 4 illustrates an example of the structure of data 500 which is transmitted and received through wired communication according to the present embodiment. A soft layer 510 includes IP data 512, an IP header 514, and a data link layer 516. The IP data 512 includes data and so forth which a user wants to transmit. The IP header 514 includes an IP address of a transmission destination. In the present embodiment, a MAC address is included in the data link layer 516. A physical layer 520 includes a physical layer signaling (PLS) sublayer 522. In the present embodiment, a MAC address is stored in the IP data 512 and the data link layer 516, as will be described below.

In the present embodiment, the data in the soft layer 510 and the physical layer 520 is transferred as is when communication is performed via between software layers of the wireless communication module 100 and the wired communication module 200, and the wired communication module 300 and the wireless communication module 400.

Figure 5:
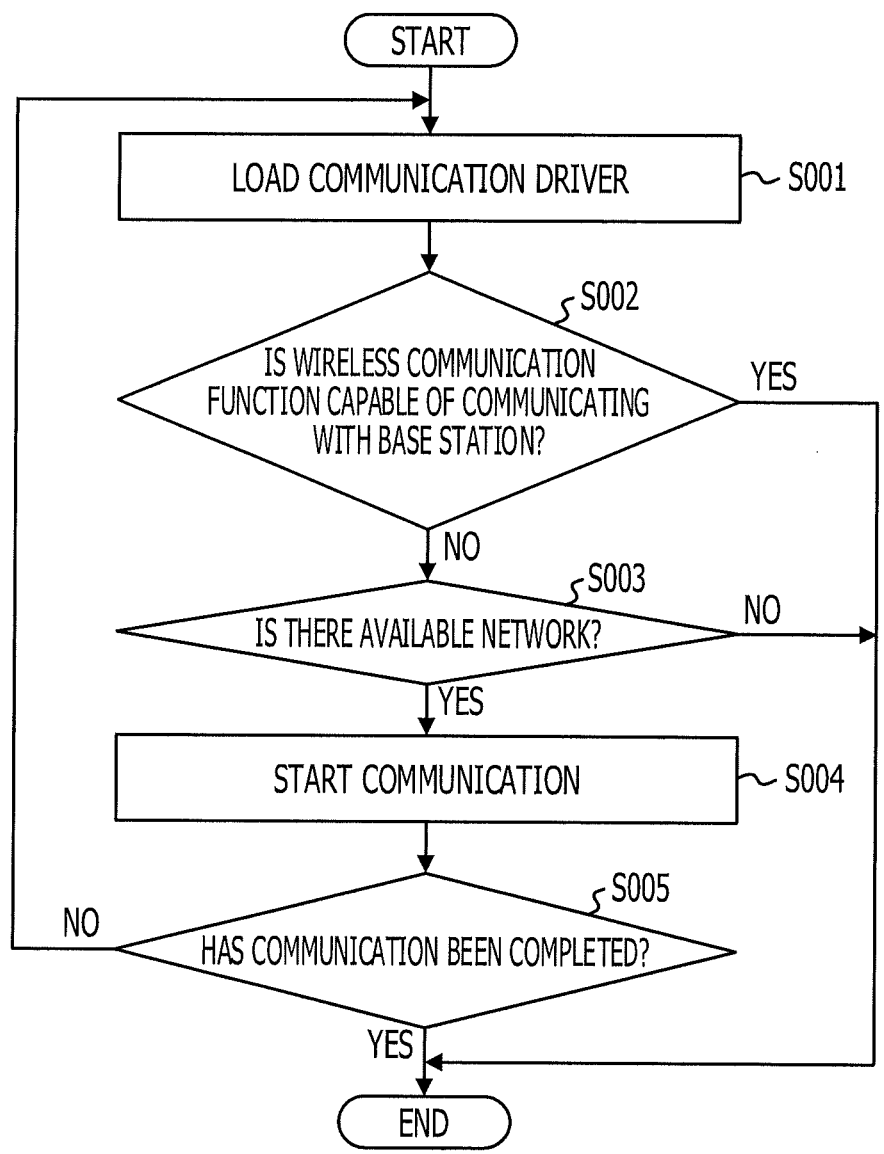
FIG. 5 is a flowchart of communication performed between information processing apparatuses.

FIG. 5 illustrates a flowchart of communication performed between the information processing apparatus 1 and the information processing apparatus 2.

In step S001, the CPU 12 loads a communication driver stored in the HDD 16 to the RAM 14. The CPU 12 becomes capable of performing the operation illustrated in the flowchart in FIG. 5 by loading the communication driver stored in the HDD 16 to the RAM 14. The process proceeds to step S002. Alternatively, the communication driver may be acquired from a portable medium, or may be downloaded from another computer via a network.

In step S002, the CPU 12 controls the wireless communication module 100 of the wireless communication function 20, and determines whether or not the wireless communication function 20 is capable of communicating with the base station 6. If the wireless communication function 20 is capable of communicating with the base station 6, the process ends. On the other hand, if the wireless communication function 20 is incapable of communicating with the base station 6, the process proceeds to step S003.

In step S003, the CPU 12 controls the wired communication module 200 of the wired communication function 18, and determines whether or not there is a network available for the wired communication function 18. If there is an available network, the process proceeds to step S004. On the other hand, if there is not an available network, the process ends.

In step S004, the CPU 12 starts a communication process between the information processing apparatus 1 and the information processing apparatus 2. The communication process between the information processing apparatus 1 and the information processing apparatus 2 will be described below with reference to FIG. 6. The process proceeds to step S005.

In step S005, the CPU 12 determines whether or not communication between the information processing apparatus 1 and the information processing apparatus 2 has been completed. If the communication has been completed, the process ends. On the other hand, if the communication has not been completed, the process returns to step S001.

In the present embodiment, description will be given of a case where the wireless communication module 400 of the information processing apparatus 2 is incapable of communicating with the base station 6, and communication with the base station 6 is established via the wireless communication module 100 of the information processing apparatus 1. In this case, it is assumed that MAC 4, which is a MAC address identifying the wireless communication module 400, is stored in the storage unit 4 of the base station 6.

Figure 6:
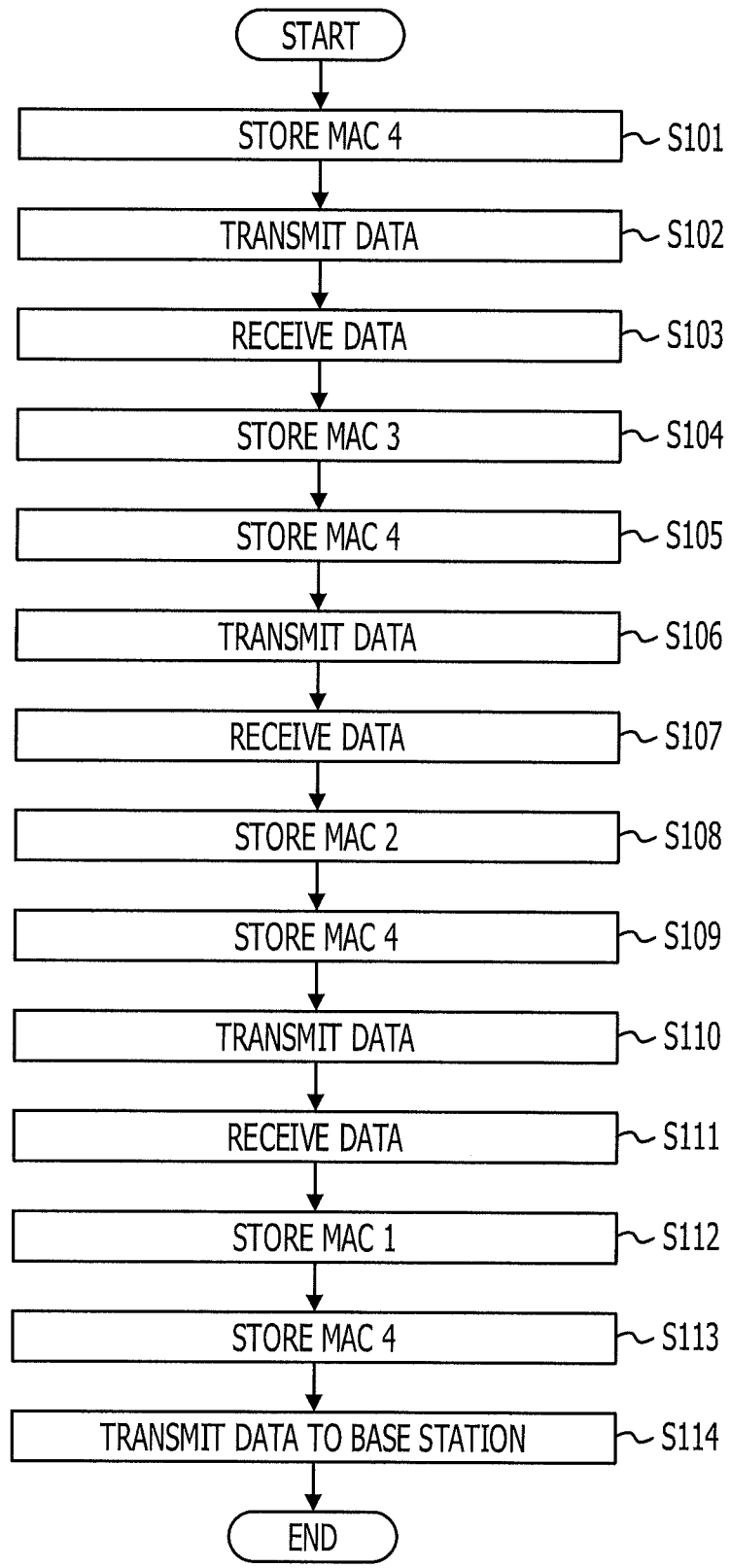
FIG. 6 is a flowchart of a process of a communication driver.

FIG. 6 illustrates a flowchart of a process of the communication driver.

In step S101, the CPU 12 generates data in which MAC 4, which is the MAC address of the wireless communication module 400, is stored in the data link layer 516. The process proceeds to step S102. The CPU 12 becomes capable of performing the operation illustrated in the flowchart in FIG. 6 by loading the communication driver stored in the HDD 16 to the RAM 14, for example.

In step S102, the CPU 12 transmits the data to the wired communication module 300. The process proceeds to step S103.

In step S103, the CPU 12 receives the data from the wireless communication module 400. The CPU 12 refers to the data link layer 516 of the data and determines MAC 4, which is the MAC address of the wireless communication module 400, thereby being capable of recognizing that the transmission source of the data is the wireless communication module 400. The process proceeds to step S104.

In step S104, the CPU 12 generates data in which MAC 3, which is the MAC address of the wireless communication module 300, is stored in the data link layer 516. The process proceeds to step S105.

In step S105, the CPU 12 generates data in which MAC 4, which is the MAC address of the wireless communication module 400, is stored in the IP data 512. The process proceeds to step S106.

In step S106, the CPU 12 transmits the data to the wired communication module 200. The process proceeds to step S107.

In step S107, the CPU 12 receives the data from the wired communication module 300. The CPU 12 refers to the data link layer 516 of the received data and determines MAC 3, which is the MAC address of the wired communication module 300, thereby being capable of recognizing that the transmission source of the data is the wired communication module 300. The process proceeds to step S108.

In step S108, the CPU 12 generates data in which MAC 2, which is the MAC address of the wired communication module 200, is stored in the data link layer 516. The process proceeds to step S109.

In step S109, the CPU 12 generates data in which MAC 4, which is the MAC address of the wireless communication module 400, is stored in the IP data 512. The process proceeds to step S110.

In step S110, the CPU 12 transmits the data to the wireless communication module 100. The process proceeds to step S111.

In step S111, the CPU 12 receives the data from the wired communication module 200. The CPU 12 refers to the data link layer 516 of the received data and determines MAC 2, which is the MAC address of the wired communication module 200, thereby being capable of recognizing that the transmission source of the data is the wired communication module 200. The process proceeds to step S112.

In step S112, the CPU 12 generates data in which MAC 1, which is the MAC address of the wireless communication module 100, is stored in the data link layer 516. The process proceeds to step S113.

In step S113, the CPU 12 generates data in which MAC 4, which is the MAC address of the wireless communication module 400, is stored in the IP data 512. The process proceeds to step S114.

In step S114, the CPU 12 transmits the data to the base station 6 via the antenna 103. The process ends.

Figure 7:
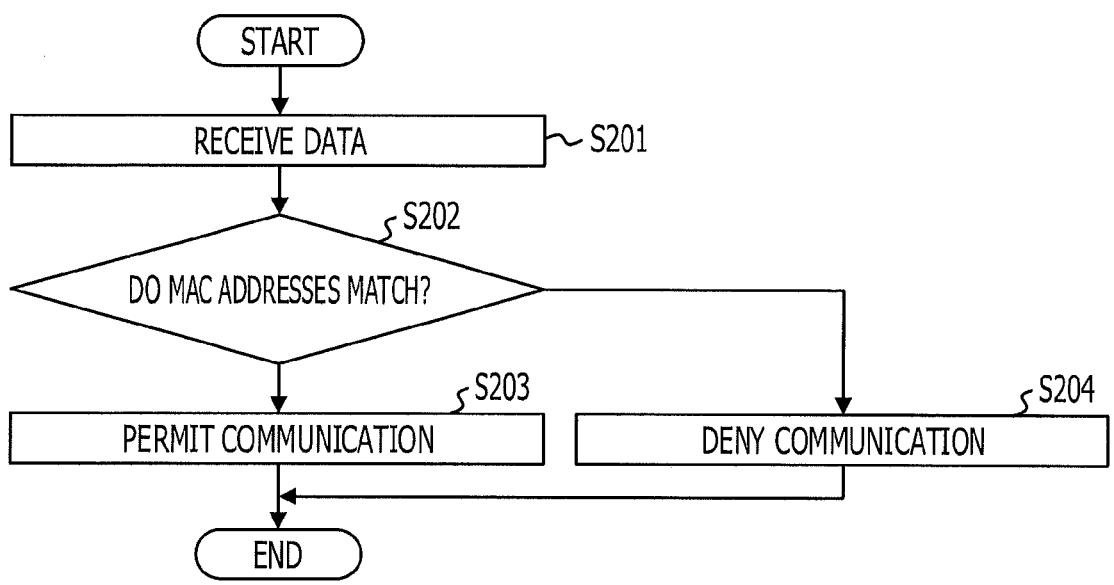
FIG. 7 is a flowchart of a process of a base station.

FIG. 7 illustrates a flowchart of a process of the base station.

In step S201, the communication unit 3 receives data from the wireless communication module 100. The communication unit 3 refers to the data link layer 516 of the received data and determines MAC 1, which is the MAC address of the wireless communication module 100, thereby being capable of recognizing that the transmission source of the data is the wireless communication module 100. The process proceeds to step S202.

In step S202, the authentication unit 5 compares the MAC address included in the IP data of the data which has been acquired via the communication unit 3, with a MAC address stored in the storage unit 4. If the MAC address included in the IP data matches the MAC address stored in the storage unit 4, the process proceeds to step S203. On the other hand, if the MAC address included in the IP data does not match the MAC address stored in the storage unit 4, the process proceeds to step S204.

In step S203, the communication unit 3 permits communication with the wireless communication module 100. The process ends. Accordingly, the base station 6 is capable of performing an authentication process in accordance with MAC 4, which is the MAC address of the wireless communication module 400, not in accordance with MAC 1, which is the MAC address of the wireless communication module 100. Also, the information processing apparatus 2 is capable of transmitting data to and receiving data from the base station 6 via the information processing apparatus 1.

In step S204, the communication unit 3 denies communication with the wireless communication module 100. The process ends.

According to the present embodiment, even if an information processing apparatus is incapable of performing communication in a communication environment, the information processing apparatus may use another communication environment. The information processing apparatus may use only an antenna of a communication module of another information processing apparatus, and is thus capable of performing communication in any communication environment. Accordingly, the convenience of the user may be dramatically enhanced. In an environment where the radio wave status is poor, the information processing apparatus is capable of using a more comfortable communication environment with higher communication speed by using a communication environment of an information processing apparatus in a good radio wave status. According to the related art, such communication is allowed only in an environment where remote connection is available, and the setting of a remote information processing apparatus may not be changed depending on the setting of security in some cases. According to the present embodiment, connection and disconnection of a communication module of a remote information processing apparatus may be achieved without changing the setting of the remote information processing apparatus, and thus the convenience of the user may be enhanced. In terms of borrowing a communication environment, a combination of wired communication and wired communication, and a combination of wireless communication and wireless communication may also be used as well as a combination of wired communication and wireless communication according to the first embodiment.

Figure 8:
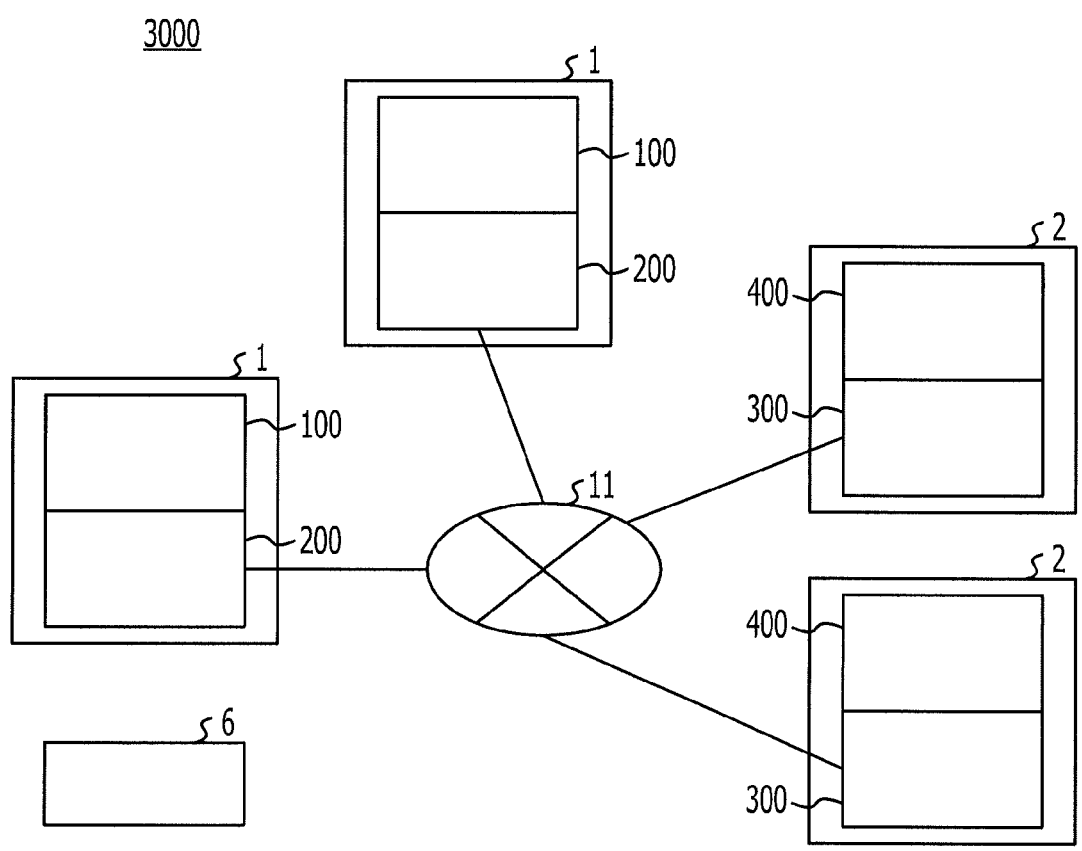
FIG. 8 is a second diagram illustrating the information processing system according to the present embodiment.

FIG. 8 illustrates an information processing system 3000 according to the present embodiment. The communication modules 200 of a plurality of information processing apparatuses 1 and the communication modules 300 of a plurality of information processing apparatuses 2 are connected to one another via the network 11. In the information processing system 3000, for example, a user may access a private wireless LAN line with MAC address authentication via the Internet by using an information processing apparatus in the user's home. Also, as a result of applying the present embodiment to a plurality of information processing apparatuses, wireless communications throughout the world may be selectively used by operating an information processing apparatus at home. Therefore, by performing communication via a remote information processing apparatus, a user may use network services in a switching manner, and use a service which is available only in a certain network, or selectively use a network which is available with low charge.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station that relays data between a first information processing apparatus and a second information processing apparatus, the base station comprising:
   a storage; and
   a processor configured to:
      store a first physical address of a first communication module in the storage, the first information processing apparatus including the first communication module with a first communication mode and a second communication module with a second communication mode different from the first communication mode
      transmit data to and receive data from the second information processing apparatus, the second information processing apparatus including a third communication module with the first communication mode and a fourth communication module with the second communication mode, and
      upon receiving a request from the second information processing apparatus when the first communication module is not capable of performing communication with the base station and the second communication module is capable of performing communication with the fourth communication module, the request including a second physical address which has been transmitted from the first information processing apparatus to the second information processing apparatus and requesting connection, permit the first information processing apparatus to perform a transmission of data to the base station via the second information processing apparatus, based on a result of comparison between the first physical address and the second physical address, the transmission of the data to the base station via the second information processing apparatus being performed by transmitting the data from the first communication module to the second communication module with a first soft layer in which a first media access control (MAC) address of the first communication module is stored in a first area, transmitting the data from the second communication module to the fourth communication module with a second soft layer in which a second MAC address of the second communication module is stored in the first area and the first MAC address is stored in a second area, transmitting the data from the fourth communication module to the third communication module with a fourth soft layer in which a fourth MAC address of the fourth communication module is stored in the first area and the first MAC address is stored in the second area, and transmitting the data from the third communication module to the base station with a third soft layer in which a third MAC address of the third communication module is stored in the first area and the first MAC address is stored in the second area.

2. The base station according to claim 1, wherein when the request is transmitted from the first information processing apparatus to the second information processing apparatus, a third physical address identifying the second communication module as a transmission source is also transmitted to the second information processing apparatus.

3. The base station according to claim 2, wherein when the request which has been received by the second information processing apparatus is transmitted, a fourth physical address identifying the third communication module as a transmission source is also transmitted.

4. The base station according to claim 1, wherein the first physical address is a MAC address, and the first information processing apparatus transmits the MAC address to the second information processing apparatus by storing the MAC address in a header of a packet.

5. The base station according to claim 1, wherein in a case where the processor permits the first information processing apparatus to transmit data to and receive data from the base station via the second information processing apparatus, the data is transmitted from the first information processing apparatus to the base station via the first communication module, the second communication module, the third communication module and the fourth communication module.

6. The base station according to claim 1, wherein each of the first, second, third, and fourth soft layers including IP data, an IP header and a data link layer, and a physical layer including a physical layer signaling sublayer, are transmitted between the first communication module and the second communication module and between the third communication module and the fourth communication module.

7. The base station according to claim 1, wherein the first communication mode is a wireless communication mode and the second communication mode is a wired communication mode.

8. A method for controlling a base station that relays data between a first information processing apparatus and a second information processing apparatus, the method comprising:
   storing a first physical address of a first communication module, the first information processing apparatus including the first communication module with a first communication mode and a second communication module with a second communication mode different from the first communication mode;
   transmitting data to and receiving data from the second information processing apparatus, the second information processing apparatus including a third communication module with the first communication mode and a fourth communication module with the second communication mode; and
   upon receiving a request via the second information processing apparatus when the first communication module is not capable of performing communication with the base station and the second communication module is capable of performing communication with the fourth communication module, the request including a second physical address which has been transmitted from the first information processing apparatus to the second information processing apparatus and requesting connection, permitting the first information processing apparatus to perform a transmission of data to the base station via the second information processing apparatus, based on a result of comparison between the first physical address and the second physical address, the transmission of the data to the base station via the second information processing apparatus being performed by transmitting the data from the first communication module to the second communication module with a first soft layer in which a first media access control (MAC) address of the first communication module is stored in a first area, transmitting the data from the second communication module to the fourth communication module with a second soft layer in which a second MAC address of the second communication module is stored in the first area and the first MAC address is stored in a second area, transmitting the data from the fourth communication module to the third communication module with a fourth soft layer in which a fourth MAC address of the fourth communication module is stored in the first area and the first MAC address is stored in the second area, and transmitting the data from the third communication module to the base station with a third soft layer in which a third MAC address of the third communication module is stored in the first area and the first MAC address is stored in the second area.

9. The method for controlling a base station according to claim 8, wherein when the request is transmitted from the first information processing apparatus to the second information processing apparatus, a third physical address identifying the second communication module as a transmission source is also transmitted to the second information processing apparatus.

10. The method for controlling a base station according to claim 9, wherein when the request is transmitted, a fourth physical address identifying the third communication module as a transmission source is also transmitted.

11. The method for controlling a base station according to claim 8, wherein the first physical address is a MAC address, and the first information processing apparatus transmits the MAC address to the second information processing apparatus by storing the MAC address in a header of a packet.

12. The method for controlling a base station according to claim 8, wherein in a case where the first information processing apparatus is permitted to transmit data to and receive data from the base station via the second information processing apparatus, the data is transmitted from the first information processing apparatus to the base station via the first communication module, the second communication module, the third communication module and the fourth communication module.

13. The method for controlling a base station according to claim 8, wherein each of the first, second, third, and fourth soft layers including IP data, an IP header and a data link layer, and a physical layer including a physical layer signaling sublayer, are transmitted between the first communication module and the second communication module and between the third communication module and the fourth communication module.

14. The method for controlling a base station according to claim 8, wherein the first communication mode is a wireless communication mode and the second communication mode is a wired communication mode.

15. An information processing system, comprising:
a base station;
a first information processing apparatus configured to a first wireless communication circuit and a first wired communication circuit; and
a second information processing apparatus configured to a second wireless communication circuit and a second wired communication circuit,
the base station that relays data between the first information processing apparatus and the second information processing apparatus, including a processor configured to:
store a first physical address of the first wireless communication circuit,
transmit data to and receive data from the second information processing apparatus, and
upon receiving a request from the second information processing apparatus when the first wireless communication circuit is not capable of performing communication with the base station and the first wired communication circuit is capable of performing communication with second wired communication circuit, the request including a second physical address which has been transmitted from the first information processing apparatus to the second information processing apparatus and requesting connection, permit the first information processing apparatus to perform a transmission of data to the base station via the second information processing apparatus, based on a result of comparison between the first physical address and the second physical address, the transmission of the data to the base station via the second information processing apparatus being performed by transmitting the data from the first communication module to the second communication module with a first soft layer in which a first media access control (MAC) address of the first communication module is stored in a first area, transmitting the data from the second communication module to the fourth communication module with a second soft layer in which a second MAC address of the second communication module is stored in the first area and the first MAC address is stored in a second area, transmitting the data from the fourth communication module to the third communication module with a fourth soft layer in which a fourth MAC address of the fourth communication module is stored in the first area and the first MAC address is stored in the second area, and transmitting the data from the third communication module to the base station with a third soft layer in which a third MAC address of the third communication module is stored in the first area and the first MAC address is stored in the second area.

16. The information processing system according to claim 15, wherein when the first information processing apparatus transmits the request, the information processing apparatus also transmits a third physical address identifying the first wired communication circuit as a transmission source to the second information processing apparatus.

17. The information processing system according to claim 16, wherein when the second information processing apparatus transmits the request which has been received, the second information processing apparatus also transmits a fourth physical address identifying the second wired communication circuit as a transmission source.

18. The information processing system according to claim 15, wherein the first physical address is a MAC address, and the first information processing apparatus transmits the MAC address to the second information processing apparatus by storing the MAC address in a header of a packet.

19. The information processing system according to claim 15, wherein in a case where the processor permits the first information processing apparatus to transmit data to and receive data from the base station via the second information processing apparatus, the data is transmitted from the first information processing apparatus to the base station via the first wireless communication circuit, the first wired communication circuit, the second wired communication circuit and the second wireless communication circuit.

20. The information processing system according to claim 15, wherein each of the first, second, third, and fourth soft layers including IP data, an IP header and a data link layer, and a physical layer including a physical layer signaling sublayer, are transmitted between the first communication module and the second communication module and between the third communication module and the fourth communication module.

* * * * *